(12) United States Patent
Fessler-Knobel et al.

(10) Patent No.: US 8,623,165 B2
(45) Date of Patent: Jan. 7, 2014

(54) DEVICE AND METHOD FOR FIXING A COMPONENT IN POSITION ON A COMPONENT CARRIER

(75) Inventors: Martin Fessler-Knobel, Munich (DE); Roland Huttner, Jesenwang (DE)

(73) Assignee: MTU Aero Engines GmbH, Munich (DE)

( * ) Notice: Subject to any disclaimer, the term of this patent is extended or adjusted under 35 U.S.C. 154(b) by 44 days.

(21) Appl. No.: 13/138,627

(22) PCT Filed: May 8, 2010

(86) PCT No.: PCT/DE2010/000521
§ 371 (c)(1),
(2), (4) Date: Sep. 13, 2011

(87) PCT Pub. No.: WO2010/130249
PCT Pub. Date: Nov. 18, 2010

(65) Prior Publication Data
US 2012/0000601 A1    Jan. 5, 2012

(30) Foreign Application Priority Data
May 14, 2009  (DE) .......................... 10 2009 021 418

(51) Int. Cl.
*B32B 37/06*  (2006.01)
(52) U.S. Cl.
USPC ..................................................... 156/275.5
(58) Field of Classification Search
USPC ........... 156/272.2, 275.5, 272.8, 379.6, 380.9
See application file for complete search history.

(56) References Cited

U.S. PATENT DOCUMENTS

| | | | | |
|---|---|---|---|---|
| 5,380,387 A | * | 1/1995 | Salamon et al. | 156/154 |
| 6,000,784 A | * | 12/1999 | Takemoto et al. | 347/50 |
| 2002/0049028 A1 | | 4/2002 | Council, Jr. et al. | 451/41 |
| 2008/0173394 A1 | * | 7/2008 | Sandmeier | 156/275.5 |
| 2009/0025220 A1 | | 1/2009 | Knobel | 29/889.7 |

FOREIGN PATENT DOCUMENTS

| | | |
|---|---|---|
| DE | 100 29 682 C1 | 12/2001 |
| DE | 10 2007 033 214 A1 | 3/2008 |
| DE | 10 2007 020 957 A1 | 11/2008 |
| EP | 19 47 156 A1 | 7/2008 |
| WO | WO 2004/014587 A2 | 2/2004 |

* cited by examiner

*Primary Examiner* — Daniel McNally
(74) *Attorney, Agent, or Firm* — Davidson, Davidson & Kappel, LLC

(57) ABSTRACT

A device for fixing a component (4) in position on a component carrier (6) using a radiation-curing adhesive agent (8), in which case the radiation (30, 32) for curing the adhesive agent (8) located between the component carrier (6) and the component (4) is laterally introducible; as well as a method for fixing a component (4) in position in a component carrier (6) using an adhesive bond.

4 Claims, 4 Drawing Sheets

Cross Section A-A

Cross Section A-A

DEVICE AND METHOD FOR FIXING A COMPONENT IN POSITION ON A COMPONENT CARRIER

The present invention relates to a device for fixing a component in position on a component carrier, and to a method for fixing a component in position on such a component carrier.

BACKGROUND

Components often pass through a multitude of processing stations before reaching their finished form. To position the components in the processing stations, component carriers are used in which the components are secured. The process of fixing the components in position in the component carriers must be rapid and reliable, and the components must be readily releasable.

The German Patent Application DE 10 2007 020 957 A1 of the Applicant provides for fixing a turbine blade in position on a component carrier using a bonded connection, for example. The component carrier has a contour-close bonding surface, onto which an adhesive agent is applied over a large area. Once the adhesive agent is applied, the turbine blade is positioned on the component carrier, and the adhesive agent is thermally cured.

This known approach does, in fact, allow the turbine blade to be securely fixed in position; however, heat generated during processing can weaken the adhesive bond.

The German Patent DE 100 29 682 C1 describes affixing a component to a component carrier using a bonded connection that is curable, respectively releasable by electromagnetic radiation. The radiation-curing adhesive agent required for this purpose is applied over a large surface area of the bonding surface of the component carrier that is permeable to the electromagnetic radiation. The component is positioned on the bonding surface, and the adhesive agent is subsequently irradiated through the bonding surface by a radiation source. The drawback of this affixing method is that the component carrier has a bonding surface that is permeable to UV radiation, for example. To avoid reflections in the vicinity of the bonding surface, the bonding surface must be treated accordingly, which weakens the adhesive bond.

The World Patent Application WO 2004/014587 discusses securing a component to a component carrier using a method that is likewise based on a radiation-curing adhesive agent. The radiation is directed via optical fibers to the adhesive agent. The particular disadvantage of this approach is the technical complexity required for the devices.

SUMMARY OF THE INVENTION

It is an object of the present invention to provide a device and a method for fixing a component in position on a component carrier that will overcome the aforementioned disadvantages and make possible an exceptionally strong adhesive bond.

This objective is achieved by a device for fixing a component in position on a component carrier, and by a method for fixing a component in position on a component carrier.

A device according to the present invention for fixing a component in position includes a component carrier for holding the component and at least one radiation source for curing an adhesive agent located between the component carrier and the component using electromagnetic radiation. In accordance with the present invention, the radiation is directed at at least one flank of the adhesive agent.

In this approach, the radiation is not directed at a component carrier-side adhesive surface to then penetrate therethrough into the adhesive agent; rather, the adhesive agent is laterally irradiated in accordance with the present invention. One advantage of lateral radiation is that the material used for forming the bonding surface is freely selectable and is not limited to glass, for example. This permits a substantially greater design freedom for the component carrier, so that only low production costs arise in the process.

The bonding surface of the component carrier is made of a radiation-impervious material. This permits the use of materials, such as tool steel, which allow a greater bond strength in comparison to known bonding surfaces of glass. It is thus possible to reduce the size of the bonding surface and, in particular, the quantity of the adhesive agent, or to increase the adhesive force per surface area.

In one exemplary embodiment, the bonding surface is band-shaped or striated. This band-shaped bonding surface form, which is narrow in comparison to the component, allows the radiation to propagate readily through the adhesive agent, thereby making possible a reliable curing. The bonding surface is preferably configured close to the contour of a component section to be accommodated, so that a uniform adhesive gap is adjustable therebetween.

In another exemplary embodiment, the component carrier features a plurality of protuberances for applying the adhesive agent. The protuberances form channels between the component carrier and the component in which the radiation is reflected. Thus, the radiation acts on all flanks, respectively side faces of the adhesive agent and not only on the flanks at which the radiation is directly aimed.

The adhesive agent curing may be accelerated by locating two radiation sources oppositely to opposing flanks of the adhesive agent.

In another exemplary embodiment, the component carrier features a mesh structure for applying the adhesive agent. A plurality of web-type, respectively linear bonding surfaces are hereby devised. The radiation source is preferably positioned at a mesh structure side that faces away from the component. Alternatively, two radiation sources may also be provided, an opening being provided in each case in the area of the radiation sources. The radiation is reflected in the intermediate spaces, respectively mesh apertures of the mesh structure, so that the reflection and the web-type form of the bonding surfaces allow the adhesive agent to cure even in the shadows of the mesh structure.

To adjust the particular adhesive gap between the component carrier and the component, it is advantageous from a standpoint of production engineering for the component carrier to be provided with spacer elements for supporting the component.

In a method according to the present invention for fixing a component in position on a component carrier, a radiation-activable adhesive agent is provided between the component carrier and the component. The component is subsequently positioned in relation to the component carrier, and the adhesive agent is laterally irradiated with electromagnetic radiation.

Other advantageous exemplary embodiments constitute the subject matter of other dependent claims.

BRIEF DESCRIPTION OF THE DRAWINGS

Preferred exemplary embodiments of the present invention are described in greater detail with reference to schematic representations.

DETAILED DESCRIPTION

Figure 1:
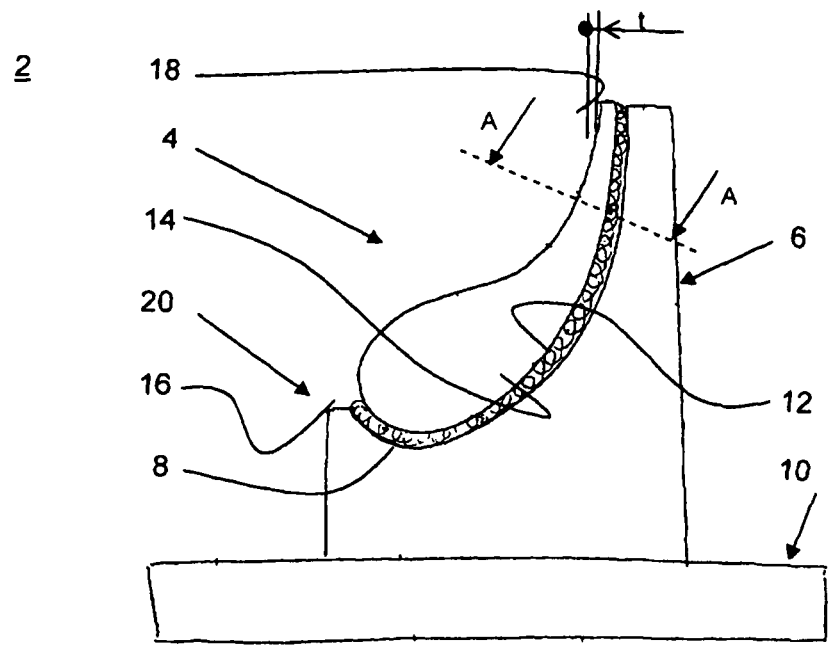
FIGS. 1 and 2 show views of a first exemplary embodiment of the present invention.

FIG. 1 shows a side view of a first device 2 according to the present invention for fixing a component 4 in position in a component carrier 6 using adhesive bonding. Component 4 is shown exemplarily as a blade of a turbine, in particular of an aircraft engine, and is referred to as such in this and in the further exemplary embodiments. The adhesive bond is based on a radiation-activable adhesive agent 8 that is curable, respectively releasable, in particular, by electromagnetic radiation.

Component carrier 6 is mounted on a base plate 10 and features a concave, respectively sickle-shaped bonding surface 12 for receiving blade 4. Bonding surface 12 is configured close to the contour of a convex intake-side portion 14 of blade 4 facing it. In the illustrated exemplary embodiment, bonding surface 12 extends from a leading edge 16 of blade 4 to a trailing edge 18.

Blade 4 is fixed in position using adhesive agent 8 which is placed between bonding surface 12 and intake-side portion 14, and, in the cured state, produces a bonded connection between component carrier 6 and blade 4. Adhesive agent 8 defines an adhesive gap 20 having depth t and is applied substantially uniformly over entire bonding surface 12. In addition, it is used for compensating for tolerances between bonding surface 12 and intake-side portion 14.

Figure 2:
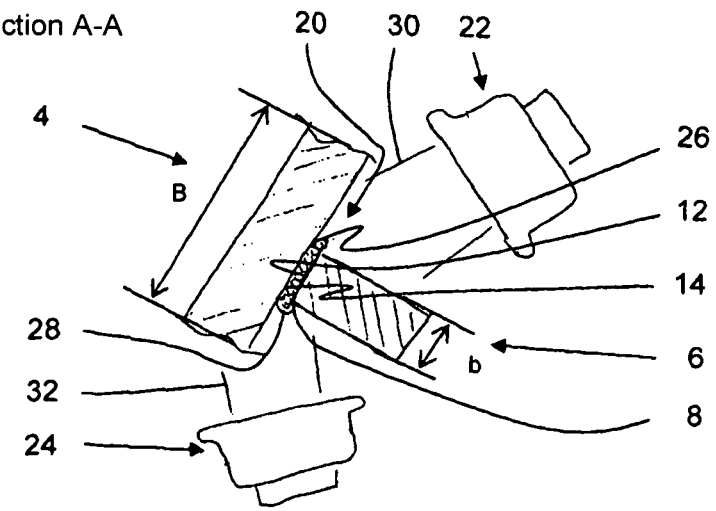

FIG. 2 shows a sectional representation through the first exemplary embodiment according to FIG. 1 along line of intersection A-A. To cure adhesive agent 8, two light sources 22, 24 (radiation sources) are provided, which irradiate mutually opposing flanks 26, 28 of adhesive agent 8 with radiation 30, 32. Light sources 22, 24 emit electromagnetic radiation 30, 32, such as ultraviolet light (UV light) or infrared radiation. They are each positioned oppositely to one of flanks 26, 28, so that adhesive agent 8 is irradiated laterally in accordance with the present invention and not through bonding surface 12.

Bonding surface 12 is formed by a striated end face of component carrier 6. It is made of a material that is impervious to electromagnetic radiation, and has a width b many times smaller than a width B of blade 4.

Adhesive gap 20 extends over entire width b of bonding surface 12. Adhesive gap 20 preferably has a depth-to-width ratio of approximately 1:10, number "1" standing for depth t and number "10" for width b.

Figure 3:
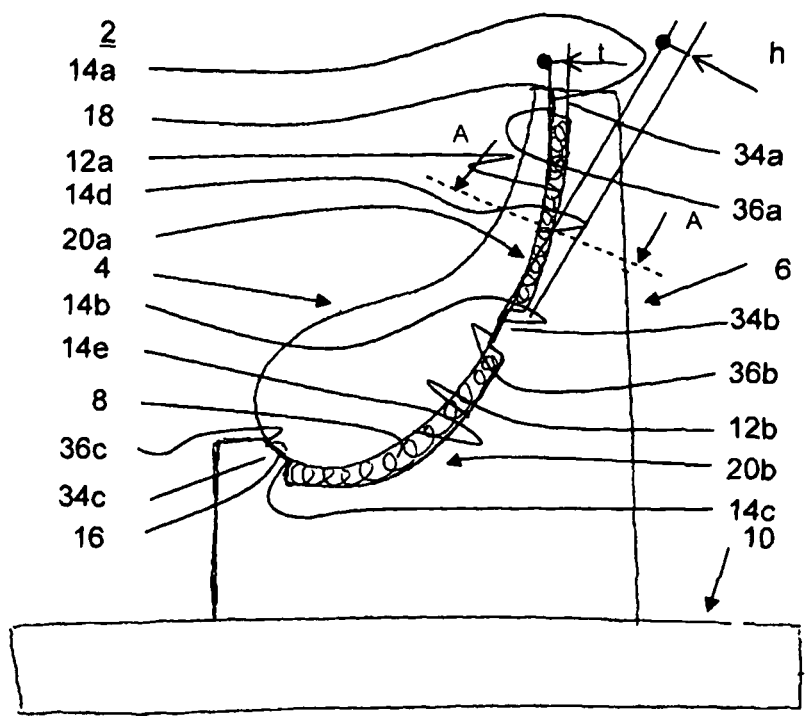
FIGS. 3 and 4 show views of a second exemplary embodiment of the present invention.

FIG. 3 shows a side view of a second exemplary embodiment of a device 2 according to the present invention for fixing a blade 4 in position in a component carrier 6 using a radiation-activable adhesive agent 8. In contrast to the first exemplary embodiment according to FIGS. 1 and 2, three spacer elements 34a, 34b, 34c are provided for positioning blades 4 on component carrier 6.

Spacer elements 34a, 34b, 34c extend from an end face of component carrier 6 in the direction of blade 4 to be received 4. Height h thereof corresponds to depth t of a distance to be adjusted between blade 4 and component carrier 6. They each feature a contact surface 36a, 36b, 36c, whose design is complementary to intake-side portion 14a, 14b, 14c of blade 4 to be received. A spacer element 34a, 34c preferably engages in the area of a trailing edge 18 and in the area of a leading edge 16 of blade 4, respectively. A spacer element 34b is configured in the middle between these two outer spacer elements 34a, 34c and subdivides single-part adhesive gap 20 shown in FIGS. 1 and 2 into two adhesive gaps 20a, 20b, each having a component-carrier side bonding surface 12a, 12b assigned thereto. Bonding surfaces 12a, 12b are configured close to the contour of opposing intake-side portions 14d, 14e.

Figure 4:
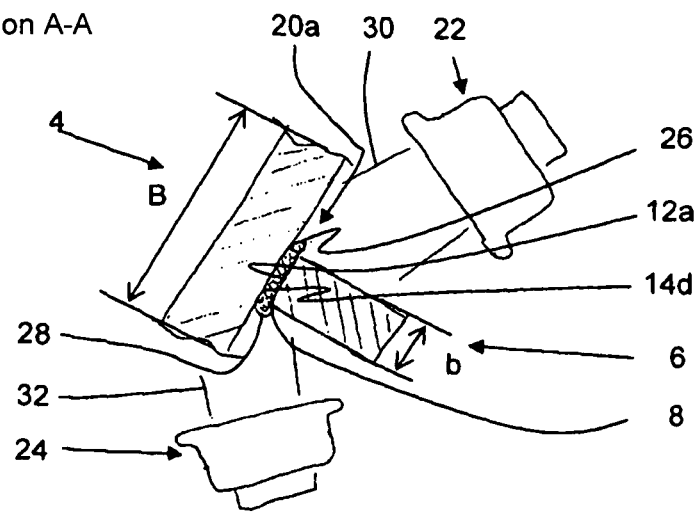

In accordance with the sectional representation in FIG. 4, adhesive agent 8 is irradiated comparably to the first exemplary embodiment, laterally through two oppositely positioned light sources 22, 24 which emit UV radiation 30, 32. Bonding surfaces 12a, 12b likewise have the same striated form, and adhesive gaps 20a, 20b feature the same depth-to-width ratio of 1:10 as bonding surface 12, respectively adhesive gap 20 of the first exemplary embodiment.

Figure 5:
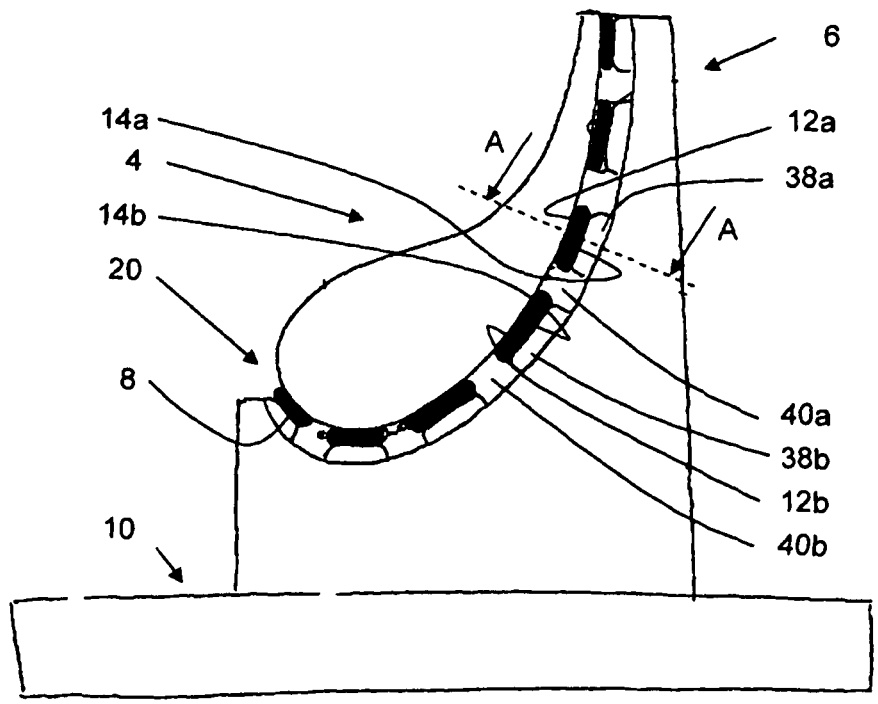
FIGS. 5 and 6 show views of a third exemplary embodiment of the present invention.

FIG. 5 shows a side view of a third exemplary embodiment of a device 2 according to the present invention for fixing a blade 4 in position in a component carrier 6 using a radiation-activable adhesive agent 8.

Component carrier 6 is mounted on a base plate 10 and features a plurality of knob-like protuberances 38a, 38b, ... on whose end faces a bonding surface 12a, 12b, ... is formed in each case for applying an adhesive agent 8. Bonding surfaces 12a, 12b, ... are formed close to the contour of an intake-side portion 14a, 14b, ... of blade 4 facing opposite thereto and are impenetrable by electromagnetic radiation 30, 32 (see FIG. 6). A plurality of transverse channels 40a, 40b, ... extending orthogonally to the drawing plane are formed between protuberances 38a, 38b, ....

Figure 6:
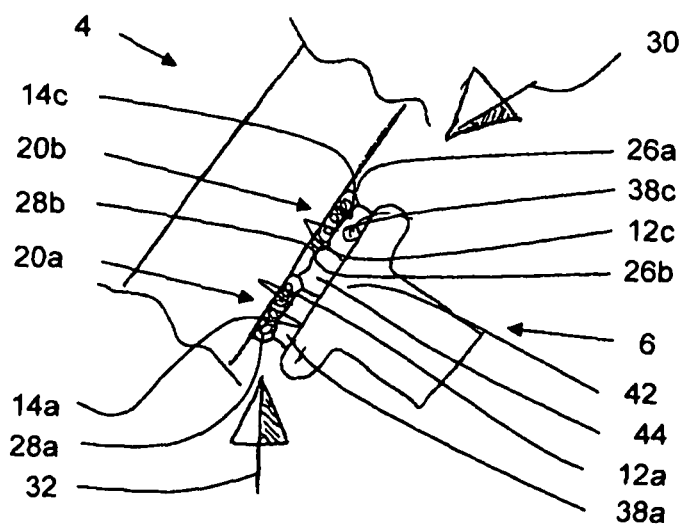

In accordance with the sectional representation in FIG. 6, protuberances 38a, 38c, ... are configured side-by-side in two rows on a portion 42 of component carrier 6 that widens in the shape of a T. They are spaced apart by a longitudinal channel 44 that extends in the transversal direction of transverse channels 40a, 40b, ... and is operatively connected thereto. Thus, two parallel adhesive gaps 20a, 20b are quasi created, each of which is composed of a plurality of individual adhesive bonds between bonding surfaces 12a, 12c, ... and opposite intake-side portions 14a, 14c, .... Each adhesive bond features the aforementioned depth-to-width ratio of 1:10.

Electromagnetic radiation 30, 32 for activating adhesive agent 8 is directed laterally at mutually opposing flanks 26a, 28a, ... of the particular adhesive bond and is reflected in channels 40a, 40b, ..., 44 between protuberances 38a, 38b, .... The reflections induce irradiation of each adhesive bond from all open flanks 26a, 26b, ..., 28a, 28b, ..., respectively sides. Thus, it is not only those flanks 26a, 28a, ... located directly opposite the light sources (not shown), that are exposed to radiation 30, 32.

Figure 7:
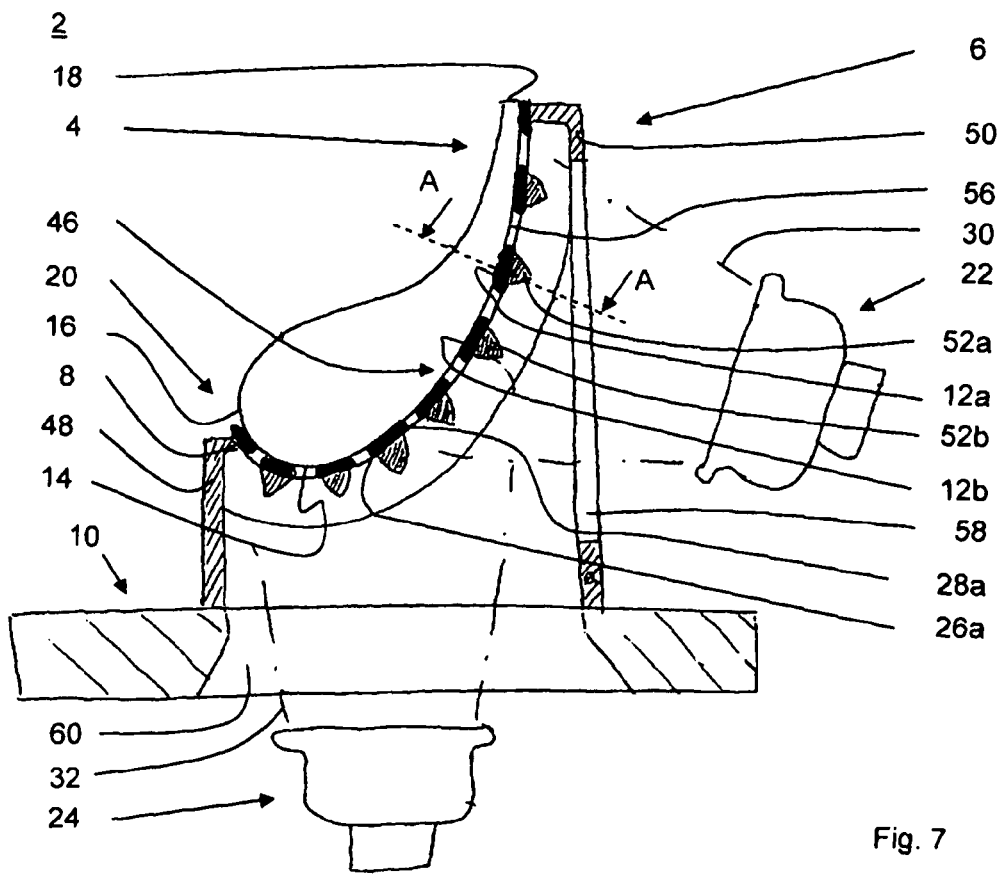
FIGS. 7 and 8 show views of a fourth exemplary embodiment of the present invention.

FIG. 7 shows a fourth exemplary embodiment according to the present invention of a device 2 for fixing a blade 4 in position on a component carrier 6 using a radiation-activable adhesive agent 8.

Component carrier 6 has a mesh structure 46 that is held by two supports, one of which is designed as a short support 48 and one as a long support 50. Supports 48, 50 are mounted by a bottom section on a base plate 10 and spaced apart from one another to the point where short support 48 is configured in the area of a leading edge 16 and long support 50 in the area of a trailing edge 18 of blade 4.

Mesh structure 46 corresponds in shape to an opposite intake-side portion 14 of blade 4 and extends between two head portions of supports 48, 50. It features a plurality of transverse webs 52a, 52b, ..., between which adhesive-free intermediate spaces 56, respectively mesh apertures are formed. Adhesive agent 8 is applied to transverse webs 52a, 52b, ... and to longitudinal webs 54a, 54c shown in FIG. 8, to form linear bonding surfaces 12a, 12b, . . . . Its viscosity is such that, prior to curing, it remains adhered to webs 52a, 52b, . . . 54a, 54c and does not flow off into intermediate spaces 56.

To cure adhesive agent 18, two electromagnetic radiation 30, 32 emitting light sources 22, 24 are provided. Light sources 22, 24 are each positioned at a side of component carrier 6 and of base plate 10 facing away from blade 4. Thus, viewed from blade 4, they are configured behind longitudinal support 50 and underneath base plate 10. Supports 48, 50, as well as base plate 10 are made of an electromagnetic radiation-impervious material, so that an opening 58, 60 is provided in longitudinal support 50 and in base plate 10, respectively, in order to irradiate blade 4 in the vicinity of light sources 22, 24.

Radiation 30, 32 enters into intermediate spaces 56, is reflected at webs 52a, 52b, ... 54a, 54b, ... and intake-side portion 14, and enters laterally via flanks 26a, 28a, ... into adhesive agent 8. The curing is initiated and propagates into those areas of adhesive agent 8 that are not directly affected by the radiation, such as the shadows of mesh structure 46.

Figure 8:
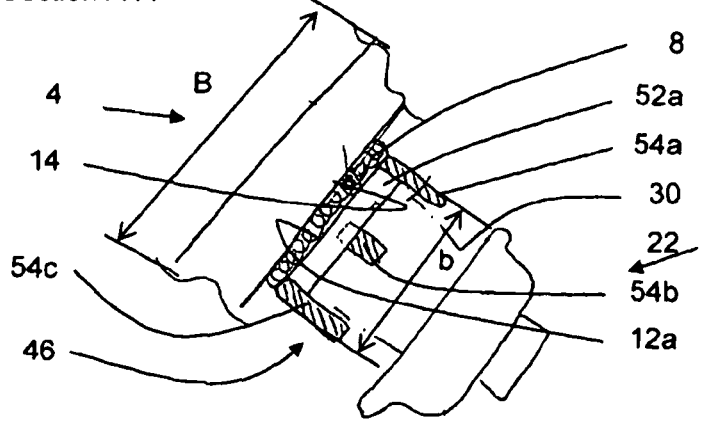

In accordance with the sectional representation in FIG. 8, transverse webs 52a, 52b, . . . are interconnected via three longitudinal webs 54a, 54b, 54c. Relative to middle longitudinal web 54b, the two outer longitudinal webs 54a, 54c are elongated toward rear light source 22 and concentrate radiation 30, 32 at mesh structure 46. Thus, radiation 30, 32 is directed between the two outer longitudinal webs 54a, 54c.

The view in FIG. 8 shows mesh structure 46 having a substantially smaller width b than blade 4. It is made of a material that is impervious to electromagnetic radiation.

In a method according to the present invention, a radiation-activable adhesive agent 8 is applied to bonding surface 12, 12a, . . . of a component carrier 6. A component 4 is then positioned next to component carrier 6 and thus to adhesive agent 8 at a defined gap distance that is advantageous for an adhesive bonding. Light sources 22, 24 are subsequently activated, and adhesive agent 18, respectively flanks 26, 28, . . . thereof is/are laterally irradiated with electromagnetic radiation 30, 32 until the required degree of cure is reached. Following curing, component 4 is fixed in position on the component carrier, and the particular processing, for example milling of the blade root, may be performed.

Once the processing is complete, the bonded connection between component carrier 6 and component 4 is released chemically, thermally, mechanically or by the reapplication of electromagnetic radiation 30, 32. A thermal releasing of the bonded connection is preferably carried out inductively.

In all of the exemplary embodiments, base plate 10 features a clamping system (not shown), such as a zero-point clamping system having magnetic, vacuum or wedge clamping or a setting out feature. Component carrier 6 is preferably generatively adapted to base plate 10 via an interface to base plate 10. Component carrier 6 is a production part, a cast part, a forged part or a milled part, for example. Component 4 is positioned on component carrier 6 absolutely or in relation to the data item pertaining to base plate 10.

In all of the described exemplary embodiments, component carrier 6 is composed, in the area of bonding surface 12, 12a, . . . thereof, of a material that does not allow electromagnetic radiation to pass through. Exemplary materials are metal and ceramic. However, the material of bonding surface 12, 12a, . . . is inconsequential, both for device 2 according to the present invention, as well as for the method according to the present invention, so that an electromagnetic radiation-transmissive material, such as glass, is likewise conceivable.

Besides UV radiation, bonding agent 8 is also activable by infrared radiation, ultrasonic radiation, X-radiation or visible light. Likewise conceivable are anaerobic, aerobic and/or bicomponent adhesive agents 8.

The depth-to-width ratio of adhesive gap 20 is not limited to 1:10; rather other ratios are also conceivable. The depth-to-width ratio is essentially a function of the chemical composition, respectively of the components of adhesive agent 8 and of the type, intensity and duration of the radiation.

A device is provided for fixing a component 4 in position on a component carrier 6 using a radiation-curing adhesive agent 8, in the case of which radiation 30, 32 for curing adhesive agent 8 is laterally introducible between component carrier 6 and component 4, as is a method for fixing a component 4 in position on a component carrier 6 using a releasable bonded connection.

The invention claimed is:

1. A method for fixing and releasing a component in position on a component carrier, comprising the steps of:
   providing a radiation-activable adhesive agent between the component carrier and the component;
   positioning the component in relation to the component carrier;
   laterally irradiating the adhesive agent with an electromagnetic radiation to bond the component to the component carrier;
   processing the component while the component is fixed to the component carrier; and
   releasing the bond between the component and the component carrier;
   wherein the component is a blade of an aircraft turbine, and after the positioning step, the component carrier supports the blade.

2. The method as recited in claim 1 wherein an adhesive gap has a depth-to-width ratio of greater than or equal to 1:10 between the component and the component carrier.

3. The method as recited in claim 2 wherein the depth-to-width ratio is 1:10.

4. The method as recited in claim 2 wherein the depth-to-width ratio is greater than 1:10.

* * * * *